US011261844B2

(12) United States Patent
Hotimsky et al.

(10) Patent No.: US 11,261,844 B2
(45) Date of Patent: Mar. 1, 2022

(54) SYSTEM AND METHOD FOR PREDICTING WIND TURBINE SHUTDOWNS DUE TO EXCESSIVE VIBRATION

(71) Applicant: General Electric Company, Schenectady, NY (US)

(72) Inventors: Chad Moshe Hotimsky, Schenectady, NY (US); Necip Doganaksoy, Glenville, NY (US)

(73) Assignee: General Electric Company, Schenectady, NY (US)

(*) Notice: Subject to any disclaimer, the term of this patent is extended or adjusted under 35 U.S.C. 154(b) by 213 days.

(21) Appl. No.: 16/288,839

(22) Filed: Feb. 28, 2019

(65) Prior Publication Data
US 2020/0277932 A1    Sep. 3, 2020

(51) Int. Cl.
*F03D 7/02* (2006.01)
*F03D 1/00* (2006.01)

(52) U.S. Cl.
CPC ......... *F03D 7/0256* (2013.01); *F03D 7/0204* (2013.01); *F03D 7/0224* (2013.01); *F03D 1/00* (2013.01); *F05B 2260/70* (2013.01); *F05B 2260/80* (2013.01); *F05B 2270/20* (2013.01); *F05B 2270/32* (2013.01);
(Continued)

(58) Field of Classification Search
CPC .... F03D 7/0256; F03D 7/0204; F03D 7/0224; F05B 2260/70; F05B 2260/80; F05B 2270/20; F05B 2270/32; F05B 2270/321; F05B 2270/334
See application file for complete search history.

(56) References Cited

U.S. PATENT DOCUMENTS

| 8,096,762 B2* | 1/2012 | Risager | F03D 7/0224 416/1 |
| 9,551,321 B2* | 1/2017 | Gerber | F03D 7/02 |
| 9,624,905 B2* | 4/2017 | Perley | F03D 7/043 |

(Continued)

FOREIGN PATENT DOCUMENTS

| EP | 2 131 038 A2 | 12/2009 |
| EP | 2 249 029 A2 | 11/2010 |
| EP | 2 754 890 A2 | 7/2014 |

OTHER PUBLICATIONS

EPO Search Report, dated Jul. 13, 2020.
(Continued)

*Primary Examiner* — Justin D Seabe
*Assistant Examiner* — Theodore C Ribadeneyra
(74) *Attorney, Agent, or Firm* — Dority & Manning, P.A.

(57) ABSTRACT

A method for operating a wind turbine includes determining at least one wind condition of the wind turbine for a plurality of time intervals. The method also includes determining a status of the wind turbine at the beginning of each of the plurality of time intervals. Further, the method includes determining at least one vibration parameter of the wind turbine for one or more preceding time intervals of the plurality of time intervals. Moreover, the method includes predicting whether a trip event is imminent based on the at least one wind condition, the status of the wind turbine at the beginning of each of the plurality of time intervals, and the vibration parameter. Thus, the method further includes implementing a control action for the wind turbine so as to prevent the trip event.

20 Claims, 5 Drawing Sheets

(52) U.S. Cl.
CPC ... *F05B 2270/321* (2013.01); *F05B 2270/334* (2013.01); *F05B 2270/402* (2013.01)

(56) References Cited

U.S. PATENT DOCUMENTS

| | | | | |
|---|---|---|---|---|
| 10,337,496 | B2* | 7/2019 | Torbohm | F03D 17/00 |
| 10,451,039 | B2* | 10/2019 | Wetzel | F03D 7/0204 |
| 2003/0160457 | A1* | 8/2003 | Ragwitz | G05B 13/048 |
| | | | | 290/44 |
| 2005/0276696 | A1* | 12/2005 | LeMieux | F03D 7/02 |
| | | | | 416/61 |
| 2006/0002792 | A1* | 1/2006 | Moroz | F03D 7/0204 |
| | | | | 416/1 |
| 2006/0033338 | A1* | 2/2006 | Wilson | F03D 13/20 |
| | | | | 290/44 |
| 2006/0140761 | A1* | 6/2006 | LeMieux | G01M 5/0066 |
| | | | | 416/61 |
| 2007/0018457 | A1* | 1/2007 | Llorente Gonzalez | |
| | | | | F03D 7/028 |
| | | | | 290/44 |
| 2007/0116572 | A1* | 5/2007 | Barbu | F03D 7/024 |
| | | | | 416/132 B |
| 2007/0205602 | A1* | 9/2007 | Willey | F03D 7/0224 |
| | | | | 290/44 |
| 2007/0216166 | A1* | 9/2007 | Schubert | F03D 7/0224 |
| | | | | 290/55 |
| 2009/0206605 | A1 | 8/2009 | Schmidt | |
| 2014/0199169 | A1* | 7/2014 | Kooijman | F03D 7/0204 |
| | | | | 416/9 |
| 2015/0093242 | A1* | 4/2015 | Enevoldsen | F03D 7/0224 |
| | | | | 416/1 |
| 2015/0167637 | A1* | 6/2015 | Kooijman | F03D 7/0292 |
| | | | | 416/1 |
| 2016/0160842 | A1* | 6/2016 | Pern Ndez De Velasco Munoz | F03D 17/00 |
| | | | | 703/7 |
| 2018/0180022 | A1* | 6/2018 | Baun | F03D 7/0264 |

OTHER PUBLICATIONS

James et al., An Introduction to Statistical Learning with Applications in R, Springer, 2013, pp. 441. (Uploaded as Part 1 and Part 2).
Hosmer, JR., et al., Applied Logistic Regression, Wiley Series in Probability and Statistics, John Wiley & Sons, 3$^{rd}$ Edition, vol. 398, 2013, 500 pages. (Web Page Only) https://books.google.com/books?id=64JYAwAAQBAJ&dq=Hosmer+Jr.,D.W.,+S.+Lemeshow.+and+R.+X.+Sturdivant+(2013).+Applied+Logistic+Regression.+3rd+Edition,+Wiley,+Hoboken,+NJ.&lr=&source=gbs_navlinks_s.
Kusiak et al., Prediction of Status Patterns of Wind Turbines: A Data-Mining Approach, Journal of Solar Energy Engineering, Transaction of the ASME, vol. 133, No. 1, Feb. 2011, pp. 011008-1 through 011008-10.
Kusiak et al., The Prediction and Diagnosis of Wind Turbine Faults, Renewable Energy, Science Direct, vol. 36, No. 1, 2011, pp. 16-23.
Kusiak et al., Prediction, Operations, and Condition Monitoring in Wind Energy, Energy, Science Direct, vol. 60, 2013, pp. 1-12.
Wang et al., Scada Data Based Condition Monitoring of Wind Turbines, Advances in Manufacturing, Springer, vol. 2, No. 1, 2014, pp. 61-69.

* cited by examiner

SYSTEM AND METHOD FOR PREDICTING WIND TURBINE SHUTDOWNS DUE TO EXCESSIVE VIBRATION

FIELD

The present disclosure relates generally to wind turbines, and more particular to a system and method for predicting wind turbine shutdowns due to excessive vibration.

BACKGROUND

Wind energy production is rapidly increasing to become an integral part of the global power generation ecosystem. Modern wind turbines are highly sophisticated systems comprised of advanced mechanical components, electrical and electronics assemblies, and control software modules in order to attain maximum conversion of wind energy into electrical energy.

Generally, a wind turbine includes a turbine that has a rotor that includes a rotatable hub assembly having multiple blades. The blades transform wind energy into a mechanical rotational torque that drives one or more generators via the rotor. The generators are sometimes, but not always, rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbines also exist. The rotor, generator, gearbox and other components are typically mounted within a housing, or nacelle, that is positioned on top of a base that may be a truss or tubular tower.

As wind turbines increase in rated power, loads and stresses exerted on the wind turbine also increase. These heavy loads need to be taken into consideration not only during the turbine design and wind park layout stages, but also during operation. Modern turbines are outfitted with a variety of sensors meant to monitor key operating and environmental parameters both internal and external to the wind turbine. Wind parks rely on Supervisory Control and Data Acquisition (SCADA) systems to manage such data. Operational real-time data includes parameters such as turbine power, wind speed, rotor speed, and generator speed. For purposes of data archiving, a typical SCADA system records data on hundreds of parameters averaged over ten-minute intervals. Changes in any value are reported as status codes. The factors contributing to a status code can be internal (i.e. operating parameters, component temperatures, vibrations) or external (i.e. extreme environmental conditions) to the wind turbine.

Based on the severity of the problem, a status code triggers an information bulletin, warning, or failure (i.e. tripping, fault). For a typical large-scale wind turbine, hundreds of different status codes can be generated and grouped into a category (such as Category I, II, III, IV and so on) based on the severity. For example, the status codes in Category I may be the most severe and may result in a turbine shutdown meant to mitigate potential damage to the turbine. Category IV status codes, on the other hand, may be principally informational. The status codes in Categories II and III may call for an immediate inspection or recommended actions for the next scheduled maintenance visit.

Status codes that lead to a turbine shutdown are of concern as they represent lost power production and often damage to a wind turbine component. Wind parks are often sited in remote to residential areas and sometimes offshore due to the requirement of wind source. If a turbine shutdown occurs, specialized engineers are often dispatched to perform diagnosis. Remote wind turbine locations are often difficult to access, and their maintenance becomes a costly challenge.

Therefore, advance prediction of turbine faults is of interest to wind power operators since this capability allows the operators to reduce the severity and frequency of faults. As such, the present disclosure is directed to a system and method for predicting wind turbine shutdowns due to excessive vibration.

BRIEF DESCRIPTION

Aspects and advantages of the invention will be set forth in part in the following description, or may be obvious from the description, or may be learned through practice of the invention.

In one aspect, the present disclosure is directed to a method for operating a wind turbine. The method includes determining, via a processor, at least one wind condition of the wind turbine for a plurality of time intervals. The method also includes determining, via the processor, a status of the wind turbine at the beginning of each of the plurality of time intervals. Further, the method includes determining, via the processor, at least one vibration parameter of the wind turbine for one or more preceding time intervals of the plurality of time intervals. Moreover, the method includes predicting, via a predictive computer model programmed within the processor, whether a trip event is imminent based on the at least one wind condition, the status of the wind turbine at the beginning of each of the plurality of time intervals, and the vibration parameter. Thus, the method further includes implementing, via the processor, a control action for the wind turbine so as to prevent the trip event.

In one embodiment, determining the status of the wind turbine at the beginning of each of the plurality of time intervals may include determining whether the wind turbine is shut down at the beginning of each of the plurality of time intervals.

In another embodiment, determining the least one vibration parameter of the wind turbine for one or more preceding time intervals of the plurality of time intervals may include determining, via the processor, a vibration level of one or more components of the wind turbine, continuously comparing, via the processor, the vibration level to a vibration threshold, generating, via the processor, a vibration-induced fault when the vibration level exceeds the vibration threshold, and determining, via the processor, a number of vibration-induced faults for the one or more preceding time intervals of the plurality of time intervals. In such embodiments, the component(s) of the wind turbine may include, for example, a bedplate, a tower, a gearbox, a generator, a main shaft, a rotor blade, or a rotor.

In further embodiments, determining the vibration level of one or more components of the wind turbine may include collecting vibration data for the plurality of time intervals via one or more sensors. In additional embodiments, determining the wind condition(s) of the wind turbine for the plurality of time intervals may include receiving, via the computer-generated model, real-time wind data for the plurality of time intervals and estimating, via the computer-generated model, the wind condition(S) of the wind turbine as a function of the real-time wind data.

In certain embodiments, the wind condition(s) may include wind speed or wind direction. In such embodiments, determining the wind condition(s) of the wind turbine for the plurality of time intervals may include determining at least one of an average wind speed and/or an average wind direction for the plurality of time intervals. In addition, determining the wind condition(s) of the wind turbine for the plurality of time intervals may include determining at least one of a predominant wind speed and/or a predominant wind direction based on the average wind speed and/or the average wind direction for the plurality of time intervals. More specifically, in one embodiment, determining the predominant wind speed and/or the predominant wind direction based on the average wind speed and/or the average wind direction for the plurality of time intervals may include generating a first wind rose for the plurality of time intervals without a trip event using the average wind speed and the average wind direction, generating a second wind rose for the plurality of time intervals with a trip even using the average wind speed and the average wind direction, and determining the predominant wind speed and the predominant wind direction using the first and second wind roses.

Thus, in particular embodiments, predicting whether the trip event is imminent based on the wind condition(s), the status of the wind turbine at the beginning of each of the plurality of time intervals, and the vibration parameter may further include predicting whether the trip event is imminent based on the predominant wind speed and the predominant wind direction, the status of the wind turbine at the beginning of each of the plurality of time intervals, and the vibration parameter.

In yet another embodiment, implementing the control action for the wind turbine so as to prevent the trip event may include pitching one or more rotor blades of the wind turbine, yawing a nacelle of the wind turbine, and/or derating the wind turbine.

In another aspect, the present disclosure is directed to a system for operating a wind turbine. The system includes a controller having at least one processor. The processor is configured to perform a plurality of operations, including but not limited to determining at least one wind condition of the wind turbine for a plurality of time intervals, determining a status of the wind turbine at the beginning of each of the plurality of time intervals, determining at least one vibration parameter of the wind turbine for one or more preceding time intervals of the plurality of time intervals, predicting, via a predictive computer model programmed within the processor, whether a trip event is imminent based on the at least one wind condition, the status of the wind turbine at the beginning of each of the plurality of time intervals, and the vibration parameter, and implementing a control action for the wind turbine so as to prevent the trip event. It should also be understood that the system may further include any of the additional features as described herein.

In yet another aspect, the present disclosure is directed to a method for operating a wind turbine. The method includes determining, via the processor, whether a shutdown event occurred during one or more of the plurality of time intervals. Further, the method includes determining, via the processor, a vibration level of one or more components of the wind turbine. Moreover, the method includes continuously comparing, via the processor, the vibration level to a vibration threshold. In addition, the method includes generating, via the processor, a vibration-induced fault when the vibration level exceeds the vibration threshold. The method also includes determining, via the processor, a number of vibration-induced faults for a preceding time interval within the plurality of time intervals. As such, the method further includes predicting, via a predictive computer model programmed within the processor, whether a trip event is imminent based on whether the shutdown event occurred during one or more of the plurality of time intervals, and the number of vibration-induced faults. Thus, the method includes implementing, via the processor, a control action for the wind turbine so as to prevent the trip event. It should also be understood that the method may further include any of the additional steps and/or features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
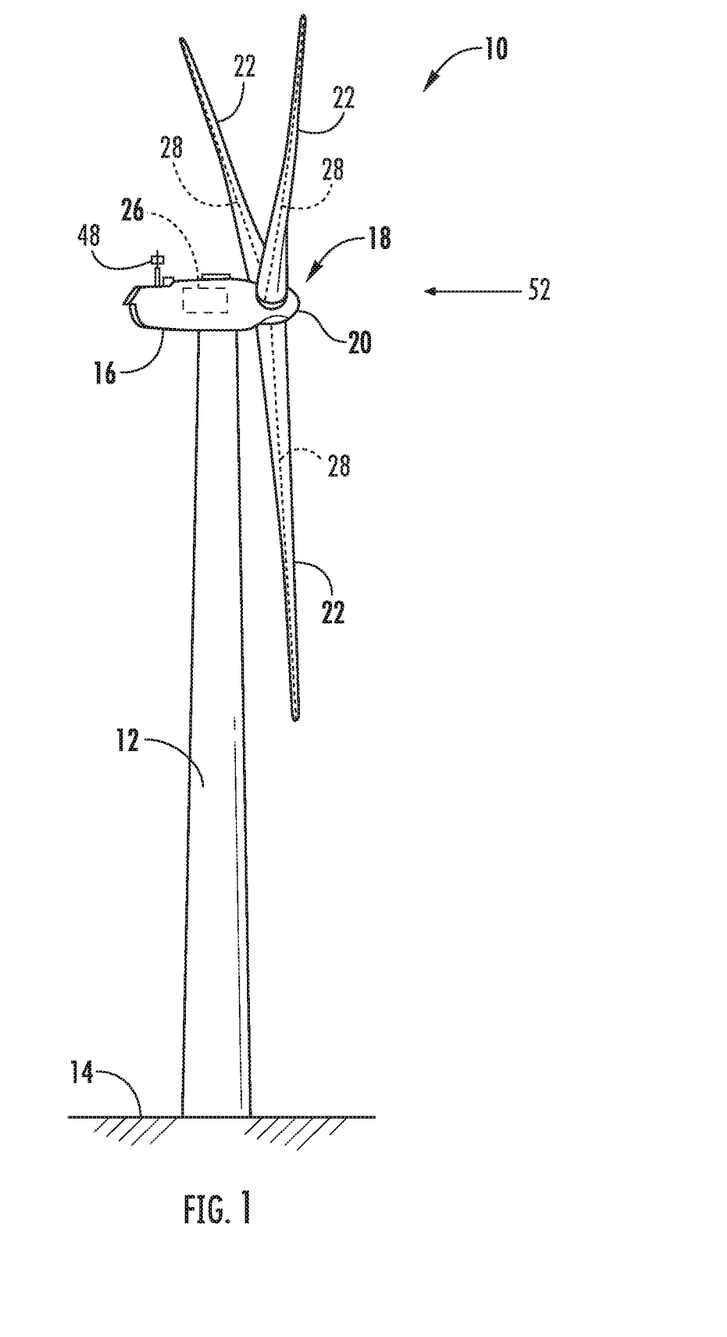
FIG. 1 illustrates a perspective view of one embodiment of a wind turbine according to the present disclosure.

Referring now to the drawings, FIG. 1 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine 10. Further, the controller 26 may be communicatively coupled to any number of the components of the wind turbine 10 in order to control the operation of such components and/or implement a corrective or control action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes (e.g., start-up or shut-down sequences), de-rating or up-rating the wind turbine, and/or individual components of the wind turbine 10.

Figure 2:
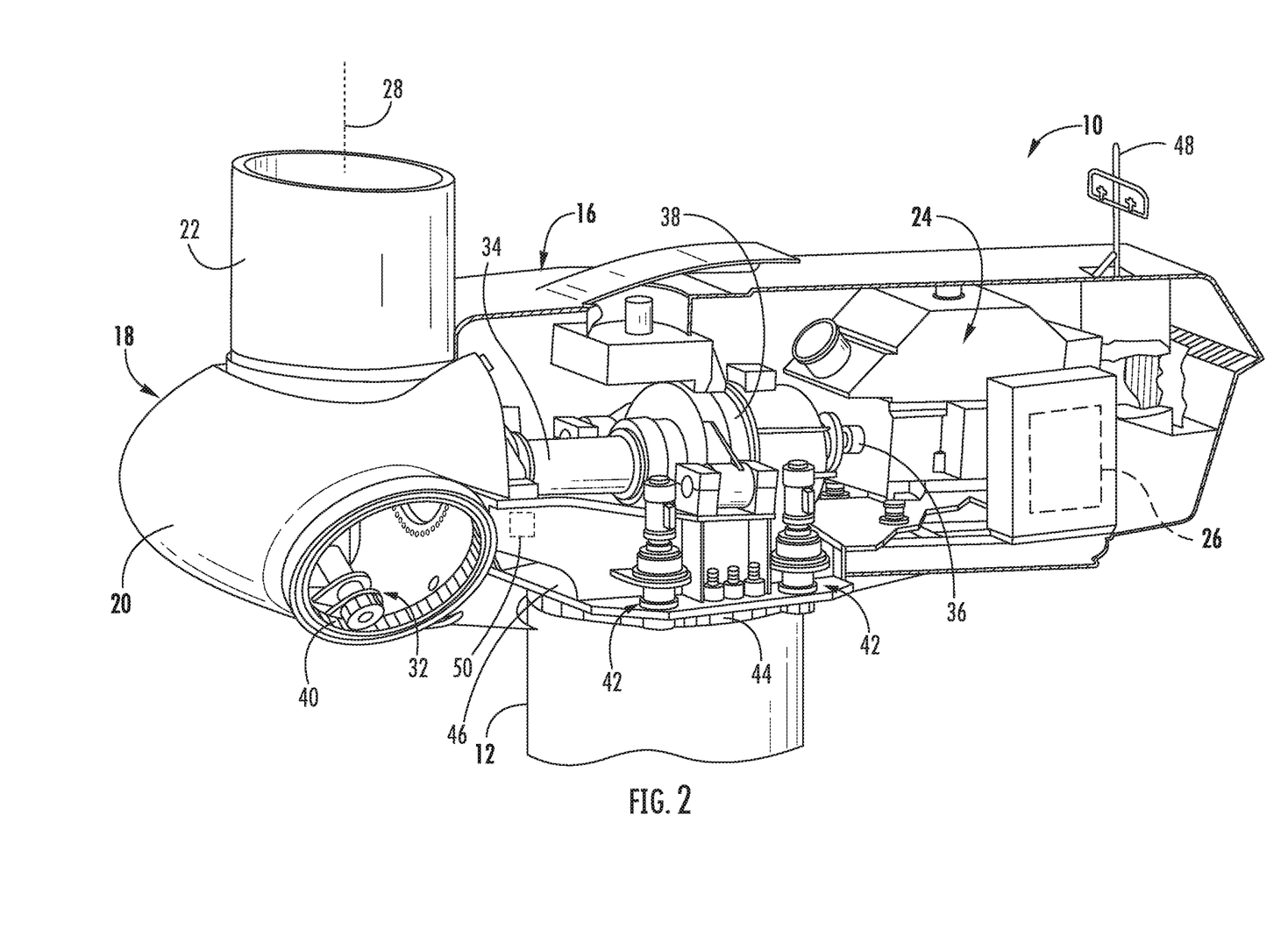
FIG. 2 illustrates a simplified, internal view of one embodiment of a nacelle according to the present disclosure.

Referring now to FIG. 2, a simplified, internal view of one embodiment of the nacelle 16 of the wind turbine 10 shown in FIG. 1 is illustrated. As shown, a generator 24 may be disposed within the nacelle 16 and supported atop a bedplate 46. In general, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

The wind turbine 10 may also one or more pitch drive mechanisms 32 communicatively coupled to the wind turbine controller 26, with each pitch adjustment mechanism(s) 32 being configured to rotate a pitch bearing 40 and thus the individual rotor blade(s) 22 about its respective pitch axis 28. In addition, as shown, the wind turbine 10 may include one or more yaw drive mechanisms 42 configured to change the angle of the nacelle 16 relative to the wind (e.g., by engaging a yaw bearing 44 of the wind turbine 10 that is arranged between the nacelle 16 and the tower 12 of the wind turbine 10).

In addition, the wind turbine 10 may also include one or more sensors 48, 50 for monitoring various wind conditions of the wind turbine 10. For example, the incoming wind direction 52, wind speed, or any other suitable wind condition near of the wind turbine 10 may be measured, such as through use of a suitable weather sensor 48. Suitable weather sensors may include, for example, Light Detection and Ranging ("LIDAR") devices, Sonic Detection and Ranging ("SODAR") devices, anemometers, wind vanes, barometers, radar devices (such as Doppler radar devices) or any other sensing device which can provide wind directional information now known or later developed in the art. Still further sensors 50 may be utilized to measure additional operating parameters of the wind turbine 10, such as vibration parameters as described herein.

Figure 3:
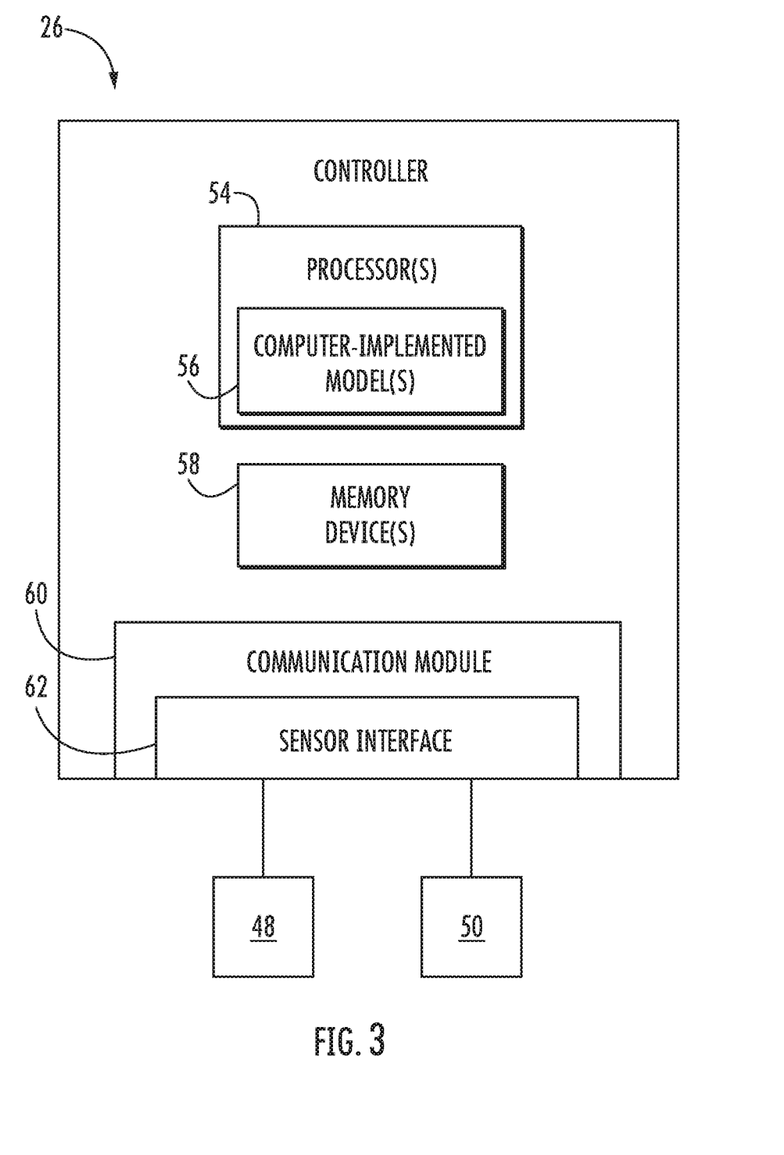
FIG. 3 illustrates a block diagram of one embodiment of a controller according to the present disclosure.

Referring now to FIG. 3, a block diagram of one embodiment of the controller 26 according to the present disclosure is illustrated. As shown, the controller 26 may include a computer or other suitable processing unit that may include suitable computer-readable instructions that, when implemented, configure the controller 26 to perform various different functions, such as receiving, transmitting and/or executing wind turbine control signals. More specifically, as shown, there is illustrated a block diagram of one embodiment of suitable components that may be included within the controller 26 in accordance with example aspects of the present disclosure. As shown, the controller 26 may include one or more processor(s) 54 having one or more computer-implemented models 56 stored therein, as well as associated memory device(s) 58 configured to perform a variety of computer-implemented functions (e.g., performing the methods, steps, calculations and the like disclosed herein).

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 58 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements.

Such memory device(s) 58 may generally be configured to store suitable computer-readable instructions that, when implemented by the processor(s) 54, configure the controller 26 to perform various functions as described herein. Additionally, the controller 26 may also include a communications interface 60 to facilitate communications between the controller 26 and the various components of the wind turbine 10. An interface can include one or more circuits, terminals, pins, contacts, conductors, or other components for sending and receiving control signals. Moreover, the controller 26 may include a sensor interface 62 (e.g., one or more analog-to-digital converters) to permit signals transmitted from the sensors 48, 50 to be converted into signals that can be understood and processed by the processor(s) 54.

Figure 4:
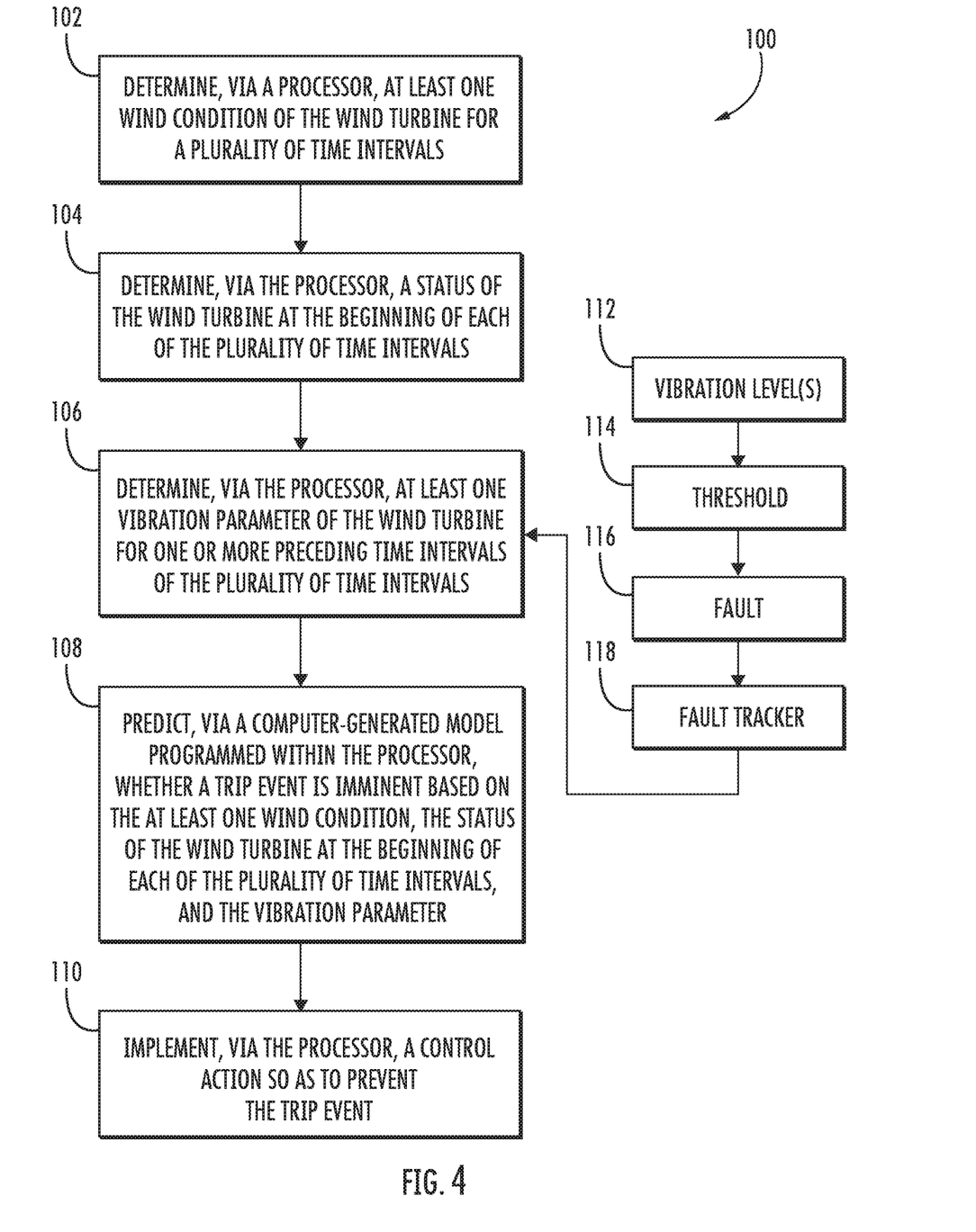
FIG. 4 illustrates a flow diagram of one embodiment of a method for operation a wind turbine according to the present disclosure.

Referring now to FIG. 4, a flow chart of one embodiment of a method 100 for operating a wind turbine is illustrated. In general, the method 100 will be described herein with reference to the wind turbine 10 and controller 26 of FIGS. 1-3. However, it should be appreciated that the disclosed method 100 may be implemented with wind turbines having any other suitable configurations. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (102), the method 100 may include determining, via the processor(s) 54, at least one wind condition of the wind turbine 10 for a plurality of time intervals. For example, in certain embodiments, the wind condition(s) may include wind speed or wind direction.

More specifically, in one embodiment, the computer-implemented model 56 described herein may correspond to transient fluid dynamics model that is configured to receive real-time wind data of the wind turbine 10 for the plurality of time intervals. The real-time data can be used by the model as initial conditions. As such, the fluid dynamics model is configured to estimate the wind condition(s) of the wind turbine 10 as a function of the real-time wind data, e.g. providing ten-minute averaged wind data on a world-wide grid of nodal points. In one example, the wind data may include a date and time measurement for a certain time interval (e.g. ten-minute intervals), a binary variable (e.g. Yes/No) indicating whether there was a turbine shutdown in the ten-minute period, an average wind speed during the time interval, and/or an average wind direction during the time interval.

Figure 5A:
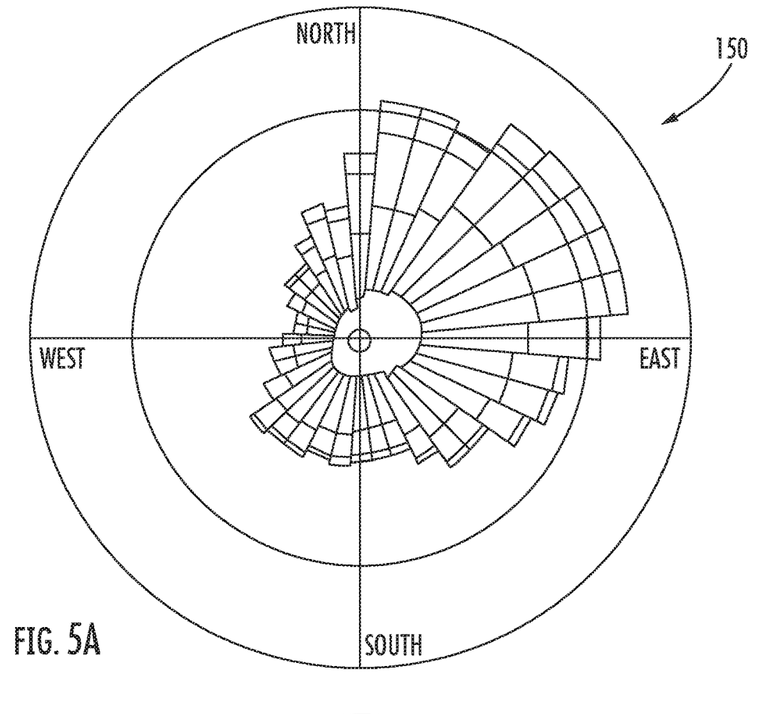
FIG. 5A illustrates one embodiment of a first wind rose representing all of the historical data without shutdowns according to the present disclosure.
Figure 5B:
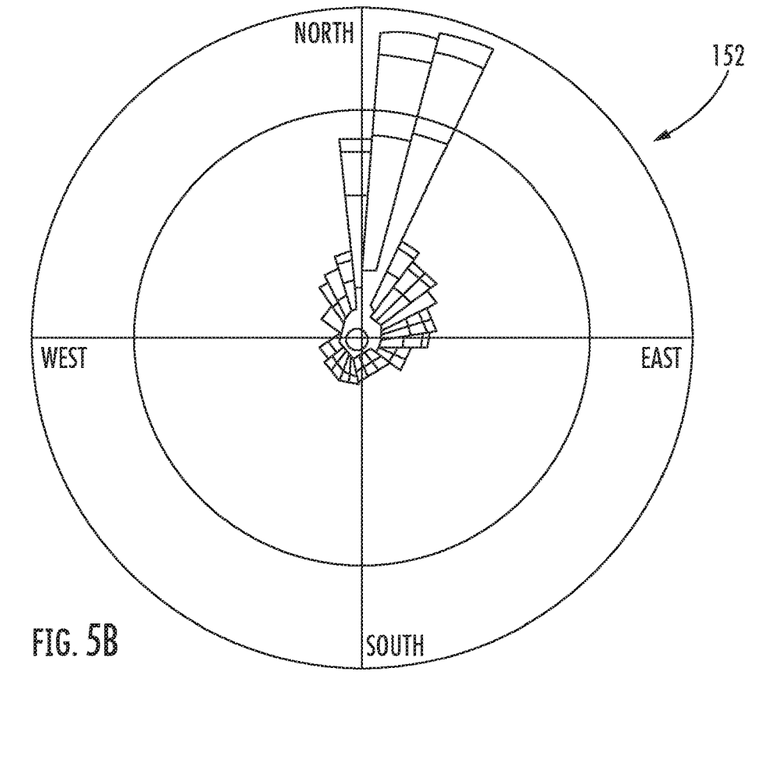
FIG. 5B illustrates one embodiment of a second wind rose with wind conditions initiating turbine shutdown according to the present disclosure.

In addition, in several embodiments, the processor(s) 54 may be configured to determine a predominant wind speed and/or a predominant wind direction based on the average wind speed and/or the average wind direction for the plurality of time intervals. For example, as shown in FIGS. 5A and 5B, the processor(s) 54 may be configured to generate first and second wind roses 150, 152 for evaluating the dependence of trip events on the prevailing wind conditions. As shown, the wind roses 150, 152 illustrate the frequency and speed of wind blowing from each direction. FIG. 5A illustrates a first wind rose 150 representing all of the historical data without shutdowns, whereas FIG. 5B illustrates a second wind rose 152 with wind conditions initiating turbine shutdown. Thus, as shown particularly in FIG. 5B, the predominant wind direction comes from the northeast direction. It should be understood that the first and second wind roses 150, 152 are provided for illustrative purposes only and are not meant to be limiting. Further, it should be understood that the configuration of the wind roses according to the present disclosure will vary, at least, based on the wind turbine site. As such, the processor(s) 54 may further be configured to generate various plots, graphs, and/or statistical analysis to further relate the wind conditions to trip events. For example, in certain instances, the processor(s) 54 may utilize histograms, scatter plots, partition tree analysis, etc., and/or combinations thereof.

Referring back to FIG. 4, as shown at (104), the method 100 may also include determining, via the processor 54, a status of the wind turbine 10 at the beginning of each of the plurality of time intervals. For example, in one embodiment, the processor 54 is configured to determine whether the wind turbine 10 is shut down at the beginning of each of the time intervals. More specifically, the processor(s) 54 may determine a start time of each shutdown event and then subsequently evaluate the de-rated power values, which indicate the length of each shutdown event.

Still referring to FIG. 4, as shown at (106), the method 100 may include determining, via the processor 54, at least one vibration parameter of the wind turbine 10 for one or more preceding time intervals of the plurality of time intervals. For example, as shown, the processor 54 may be configured to determine a vibration level 112 of one or more components of the wind turbine 10. More specifically, in certain embodiments, the processor(s) 54 may collect vibration data for the plurality of time intervals via one or more sensors (e.g. via sensor(s) 50).

In such embodiments, the component(s) of the wind turbine 10 may include, for example, the bedplate 46, the tower 12, the gearbox 38, the generator 24, the main shaft 34, one or more of the rotor blades 22, the rotor 18, and/or any other wind turbine component. Thus, as shown at 114, the processor 54 is configured to continuously compare the vibration level 112 to a vibration threshold 114. If the vibration level exceeds the vibration threshold, the processor 54 is configured to generate a vibration-induced fault 116. Thus, the processor 54 may also include a fault tracker 118 configured to determine or track a number of vibration-induced faults for the one or more preceding time intervals of the plurality of time intervals.

As shown at (108), the method 100 may include predicting, via a predictive computer model programmed within the processor 54, whether a trip event is imminent based on the various wind condition(s), the status of the wind turbine 10 at the beginning of each of the plurality of time intervals (i.e. whether the wind turbine 10 is shutdown at the beginning of a preceding time interval), and/or the vibration parameter. Thus, in particular embodiments, the processor(s) 54 is configured to predict whether the trip event is imminent using the predominant wind speed and the predominant wind direction, the status of the wind turbine at the beginning of each of the plurality of time intervals, and the vibration levels of the various wind turbine components.

More specifically, in certain embodiments, the processor(s) 54 may be configured to follow a predetermined algorithm for predicting an imminent trip event. In one embodiment, for example, if there was a shutdown within a preceding time interval (e.g. within the last 10-minute interval), the processor(s) 54 is configured to set an indicator variable as "YES" irrespective of the duration of the shutdown following a vibration-induced fault. In addition, as mentioned, the processor(s) 54 is configured to determine a number of vibration faults in a preceding time interval (e.g. the previous hour). Such informational alarms typically do not cause a shutdown event. Thus, by considering previous shutdown events as well as previous vibration alarms/faults, the processor(s) 54 can more accurately predict impending shutdown events. In one embodiment, for example, to model the probability of a shutdown event in a subsequent time interval, the processor(s) 54 may use logistic regression with a logit function, according to Equation (1) below:

$$P(\text{Shutdown} = \text{Yes}) = \frac{1}{1 + e^{-f(x)}} \qquad \text{Equation (1)}$$

where f(x) is a linear function which includes the wind condition(s), previous shutdown events, and the number of vibration faults as variables. The odds ratio can then be calculated for each of the quadrants of the wind roses 150, 152 described herein. If the odd ratio for a particular quadrant is greater than unity, the risk of experiencing a shutdown in the next time interval increases when there is a shutdown in the previous time interval and a greater number of vibration alarms in the previous hour. More particularly, based on the predictive computer model, the processor(s) 54 predicts that a shutdown event is imminent if the estimate of P(Shutdown=Yes) from Equation (s) exceeds a threshold probability value. Accordingly, by more accurately predicting an impending shutdown in advance, the present disclosure leads to substantial gains through downtime avoidance, thereby increasing operation time and the revenue associated with energy production.

Referring still to FIG. 4, as shown at (110), the method 100 may include implementing, via the processor 54, a control action for the wind turbine so as to prevent the trip event. For example, in one embodiment, the control action may include pitching one or more rotor blades 22 of the wind turbine 10, yawing the nacelle 16 of the wind turbine 10 (e.g. away from the incoming wind direction 52), derating the wind turbine 10, and/or any other suitable control action.

Exemplary embodiments of a wind turbine, a controller for a wind turbine, and methods of controlling a wind turbine are described above in detail. The methods, wind turbine, and controller are not limited to the specific embodiments described herein, but rather, components of the wind turbine and/or the controller and/or steps of the methods may be utilized independently and separately from other components and/or steps described herein. For example, the controller and methods may also be used in combination with other wind turbine power systems and methods, and are not limited to practice with only the power system as described herein. Rather, the exemplary embodiment can be implemented and utilized in connection with many other wind turbine or power system applications, such as solar power systems.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a wind turbine, the method comprising:
   determining, via a processor, at least one wind condition of the wind turbine for a plurality of time intervals;
   determining, via the processor, a status of the wind turbine at the beginning of each of the plurality of time intervals;
   determining, via the processor, at least one vibration parameter of the wind turbine for one or more preceding time intervals of the plurality of time intervals;
   predicting for a subsequent time interval and a wind condition at the subsequent time interval, via a predictive computer model programmed within the processor, whether a trip event is imminent for the subsequent time interval based on the following factors for the preceding time intervals: the at least one wind condition, the status of the wind turbine at the beginning of each of the plurality of time intervals, and the vibration parameter; and,
   implementing, via the processor, a control action for the wind turbine so as to prevent the trip event.

2. The method of claim 1, wherein determining the status of the wind turbine at the beginning of each of the plurality of time intervals further comprises determining whether the wind turbine is shut down at the beginning of each of the plurality of time intervals.

3. The method of claim 1, wherein determining the least one vibration parameter of the wind turbine for one or more preceding time intervals of the plurality of time intervals further comprises:
   determining, via the processor, a vibration level of one or more components of the wind turbine;
   continuously comparing, via the processor, the vibration level to a vibration threshold;
   generating, via the processor, a vibration-induced fault when the vibration level exceeds the vibration threshold; and,
   determining, via the processor, a number of vibration-induced faults for the one or more preceding time intervals of the plurality of time intervals.

4. The method of claim 3, wherein determining the vibration level of one or more components of the wind turbine further comprises collecting vibration data for the plurality of time intervals via one or more sensors.

5. The method of claim 1, wherein determining the at least one wind condition of the wind turbine for the plurality of time intervals further comprises:
   receiving, via the computer-generated model, real-time wind data for the plurality of time intervals; and,
   estimating, via the computer-generated model, the at least one wind condition of the wind turbine as a function of the real-time wind data.

6. The method of claim 1, wherein the at least one wind condition comprises wind speed or wind direction.

7. The method of claim 6, wherein determining the at least one wind condition of the wind turbine for the plurality of time intervals further comprises determining at least one of an average wind speed and/or an average wind direction for the plurality of time intervals.

8. The method of claim 7, wherein determining the at least one wind condition of the wind turbine for the plurality of time intervals further comprises:
   determining at least one of a predominant wind speed and/or a predominant wind direction based on the average wind speed and/or the average wind direction for the plurality of time intervals.

9. The method of claim 8, wherein determining at least one of the predominant wind speed and/or the predominant wind direction based on the average wind speed and/or the average wind direction for the plurality of time intervals further comprises:
   generating a first wind rose for the plurality of time intervals without a trip event using the average wind speed and the average wind direction;
   generating a second wind rose for the plurality of time intervals with a trip even using the average wind speed and the average wind direction; and,
   determining the predominant wind speed and the predominant wind direction using the first and second wind roses.

10. The method of claim 9, wherein predicting whether the trip event is imminent based on the at least one wind condition, the status of the wind turbine at the beginning of each of the plurality of time intervals, and the vibration parameter further comprises:
    predicting whether the trip event is imminent based on the predominant wind speed and the predominant wind direction, the status of the wind turbine at the beginning of each of the plurality of time intervals, and the vibration parameter.

11. The method of claim 1, wherein implementing the control action for the wind turbine so as to prevent the trip event further comprises at least one of pitching one or more rotor blades of the wind turbine, yawing a nacelle of the wind turbine, or derating the wind turbine.

12. The method of claim 3, wherein the one or more components of the wind turbine comprise at least one of a bedplate, a tower, a gearbox, a generator, a main shaft, a rotor blade, or a rotor.

13. A system for operating a wind turbine, the system comprising:
- a controller comprising at least one processor, the processor configured to perform a plurality of operations, the plurality of operations comprising:
- determining at least one wind condition of the wind turbine for a plurality of time intervals;
- determining a status of the wind turbine at the beginning of each of the plurality of time intervals;
- determining at least one vibration parameter of the wind turbine for one or more preceding time intervals of the plurality of time intervals;
- predicting for a subsequent time interval and a wind condition at the subsequent time interval, via a predictive computer model programmed within the processor, whether a trip event is imminent for the subsequent time interval based on the following factors for the preceding time intervals: the at least one wind condition, the status of the wind turbine at the beginning of each of the plurality of time intervals, and the vibration parameter; and,
- implementing a control action for the wind turbine so as to prevent the trip event.

14. A method for operating a wind turbine, the method comprising:
- determining, via the processor, whether a shutdown event occurred during one or more of a plurality of time intervals;
- determining, via the processor, a vibration level of one or more components of the wind turbine;
- continuously comparing, via the processor, the vibration level to a vibration threshold;
- generating, via the processor, a vibration-induced fault when the vibration level exceeds the vibration threshold;
- determining, via the processor, a number of vibration-induced faults for a preceding time interval within the plurality of time intervals;
- predicting, via a predictive computer model programmed within the processor, whether a trip event is imminent based on whether the shutdown event occurred during one or more of the plurality of time intervals and the number of vibration-induced faults; and,
- implementing, via the processor, a control action for the wind turbine so as to prevent the trip event.

15. The system of claim 14, further comprising determining at least one wind condition of the wind turbine for the plurality of time intervals by:
- receiving, via the computer-generated model, real-time wind data for a plurality of time intervals; and,
- estimating, via the computer-generated model, the at least one wind condition of the wind turbine as a function of the real-time wind data.

16. The method of claim 15, wherein the at least one wind condition comprises wind speed or wind direction.

17. The method of claim 16, wherein determining the at least one wind condition of the wind turbine for the plurality of time intervals further comprises determining at least one of an average wind speed and/or an average wind direction for the plurality of time intervals.

18. The system of claim 17, wherein determining the at least one wind condition of the wind turbine for the plurality of time intervals further comprises:
- determining at least one of a predominant wind speed and/or a predominant wind. direction based on the average wind speed and/or the average wind direction for the plurality of time intervals.

19. The system of claim 18, wherein determining at least one of the predominant wind speed and/or the predominant wind direction based on the average wind speed and/or the average wind direction for the plurality of time intervals further comprises:
- generating a first wind rose for the plurality of time intervals without a trip event using the average wind speed and the average wind direction;
- generating a second wind rose for the plurality of time intervals with a trip even using the average wind speed and the average wind direction; and,
- determining the predominant wind speed and the predominant wind direction using the first and second wind roses.

20. The system of claim 14, wherein implementing the control action for the wind turbine so as to prevent the trip event further comprises at least one of pitching one or more rotor blades of the wind turbine, yawing a nacelle of the wind turbine, or derating the wind turbine.

* * * * *